(No Model.)  2 Sheets—Sheet 1.

J. W. COOPER.
Car Truck.

No. 232,392.   Patented Sept. 21, 1880.

Witnesses:
P. B. Turpin,
Wm. C. McGill.

Inventor:
John W. Cooper,
By R. S. & A. P. Lacey, Attys.

N. PETERS, PHOTO-LITHOGRAPHER, WASHINGTON, D. C.

(No Model.) 2 Sheets—Sheet 2.
J. W. COOPER.
Car Truck.
No. 232,392. Patented Sept. 21, 1880.
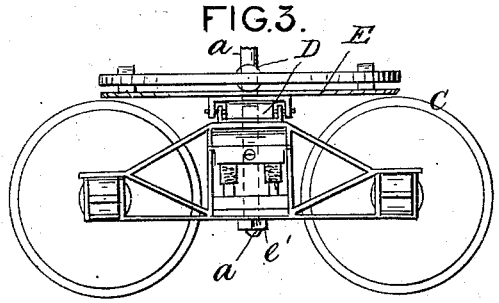
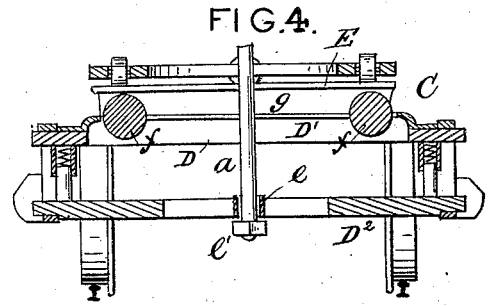
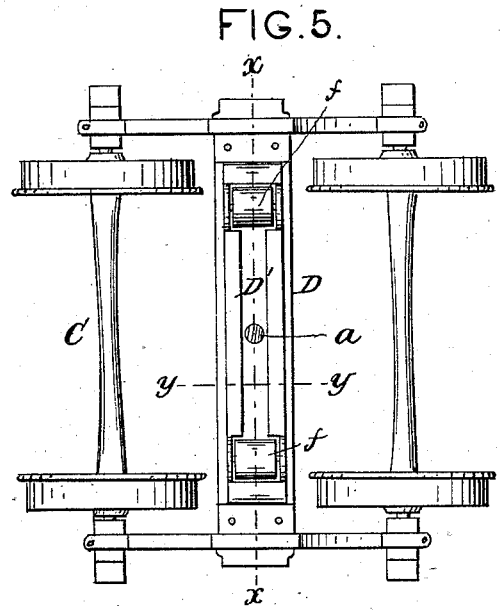
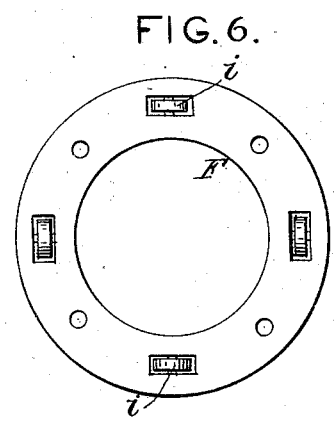
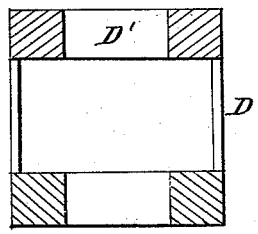
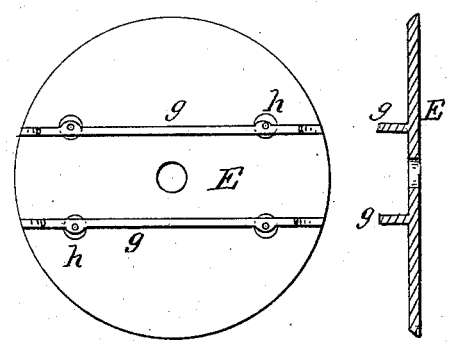
Witnesses:
P. B. Turpin,
Wm. C. McGill,
Inventor:
John W. Cooper,
By R. S. & A. Lacey, Att'ys.
N. PETERS, PHOTO-LITHOGRAPHER, WASHINGTON, D. C.

UNITED STATES PATENT OFFICE.

JOHN W. COOPER, OF NEW CASTLE, PENNSYLVANIA.

CAR-TRUCK.

SPECIFICATION forming part of Letters Patent No. 232,392, dated September 21, 1880.

Application filed June 30, 1880. (No model.)

*To all whom it may concern:*

Be it known that I, JOHN W. COOPER, a citizen of the United States, resident at New Castle, in the county of Lawrence and State of Pennsylvania, have invented certain new and useful Improvements in Trucks for Railway-Cars; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in railroad-car trucks, having for its object to enable the intermediate truck to slide or have a limited lateral movement while rounding a curve to lessen the frictional contact between the wheels and the track; and it consists of a truck having a longitudinally-slotted beam arranged transversely to the tread of the wheels, and adapted to move or slide against the under side of a plate capable of guiding its movement; and, further, of certain details of construction, substantially as hereinafter more fully set forth.

Figure 1:
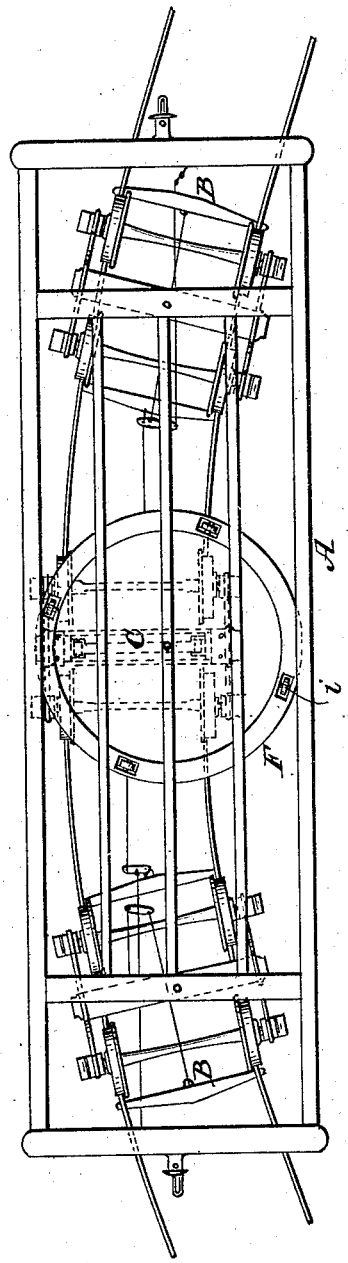
Figure 2:
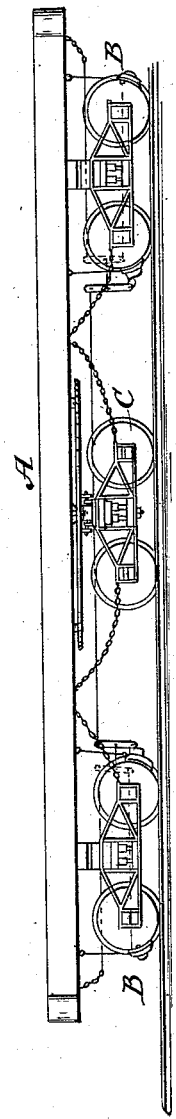

In the accompanying drawings, Figure 1 is a plan view of the bottom frame of a car with my improvement applied thereto. Fig. 2 is a side view thereof. Figs. 3, 4, and 5 are respectively a side view of my improvement, a sectional view on line $x\ x$ of Fig. 5, and a plan view of the same. Fig. 6 is a plan view of one of the details of my improvement. Fig. 7 is a section on line $y\ y$ of Fig. 5, and Fig. 8 is a plan and a sectional view of another detail of my improvement.

A indicates the car-frame, mounted at its ends upon the usual trucks B B and at an intermediate point upon the sliding truck C, which contains my improvement. This truck has a central beam or cross-piece, D, with a longitudinal slot, D', extending through it and arranged transversely to the tread of the wheels of the truck. It (the slot D') is of sufficient width to permit the king-bolt $a$ to pass through it and confine the truck to the car or frame and avoid unnecessary movement of the truck in the direction of the length of the car, while it is of such length as to permit the truck to have the required lateral movement to enable its wheels to conform to the curvature of the track, which lessens friction, &c.

The king-bolt $a$ reaches down through a slot in a similar parallel cross-piece, $D^2$, fastened to the piece or beam D, and is fitted therein with a collar, $e$, and below the latter with a nut, $e'$, retaining it in place.

Hung or journaled in enlargements of and at the ends of the slot D' are friction-rolls $f\ f$, which travel and bear against an upper disk or plate. E is the aforesaid disk or plate, resting upon the rolls $f\ f$ and fitted and rotating upon the king-bolt $a$, and having parallel downward-extended flanges $g\ g$, also supplied with anti-friction rolls $h\ h$, which are hung horizontally therein to cause them to bear laterally against the beam or piece D, the latter fitting up between said flanges $g\ g$. This arrangement permits of the guiding of the beam or truck during its lateral movement, and at the same time holds the parts in their relative position, the guides or flanges $g\ g$ being rigidly fixed to rotate with the plate E, and are always in line with transverse movement of the truck.

F is a circular disk or annulus fastened or bolted to the bottom of the car-frame, and also having anti-friction rolls $i\ i$. The disk E bears against the rolls $i$ of the annulus F, to lessen friction as the disk more or less vibrates or moves, being acted upon by the motion of the truck.

From the foregoing it will be observed that the intermediate truck is adapted to adjust itself to the curvature of the track with the least possible friction, it being free to slide the moment the wheels strike, travel, and leave the curve without any resistance whatever, which greatly lessens wear, the danger of breaking the axles, and of the wheels jumping the track.

Having thus fully described my invention, I claim and desire to secure by Letters Patent—

1. In a supplemental truck for cars interposed between the end trucks and sliding laterally under the car, the plate E, provided with the parallel projections $g\ g$, which guide the truck in its transverse movement and held by and turning on the king-bolt fixed to the car-body, substantially as set forth.

2. In a supplemental truck for cars interposed between the end trucks and sliding transversely, the combination of the roller-plate F, fixed to the car-body, the king-bolt a, the rotating plate E, furnished with guides g g and rollers h h, which guide the truck in its transverse movement, and the truck head or beam D, placed in the channel or way formed by the guides g g and turning with the plate E, substantially as set forth.

3. In a supplemental truck for cars interposed between the end trucks and sliding transversely under the car, the combination of the plate E, having guides g g and turning on the king-bolt a, and the car-truck having its central transverse beams D D² provided with the vertical longitudinal slot D', and held to the plate E by the king-bolt, and sliding freely transversely under the car and turning with the plate E, substantially as set forth.

In testimony that I claim the foregoing I have hereunto set my hand this 25th day of June, 1880.

JOHN W. COOPER.

Witnesses:
GEO. W. MILLER,
CYRUS ROOSE.